June 11, 1968
R. L. TILTON
3,387,963
ANNEALING LEHR FOR GLASS SHEETS WITH
RERADIATING SIDE WALL PLATES
Filed June 25, 1964
2 Sheets-Sheet 1
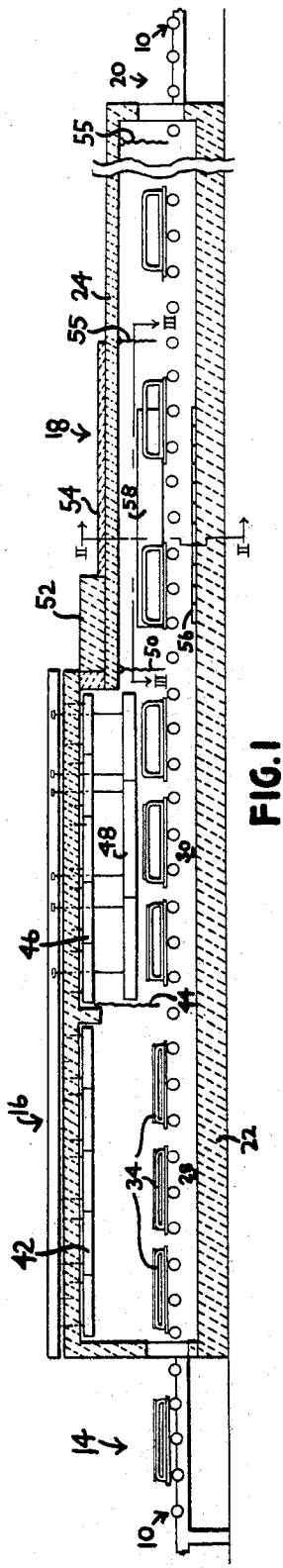
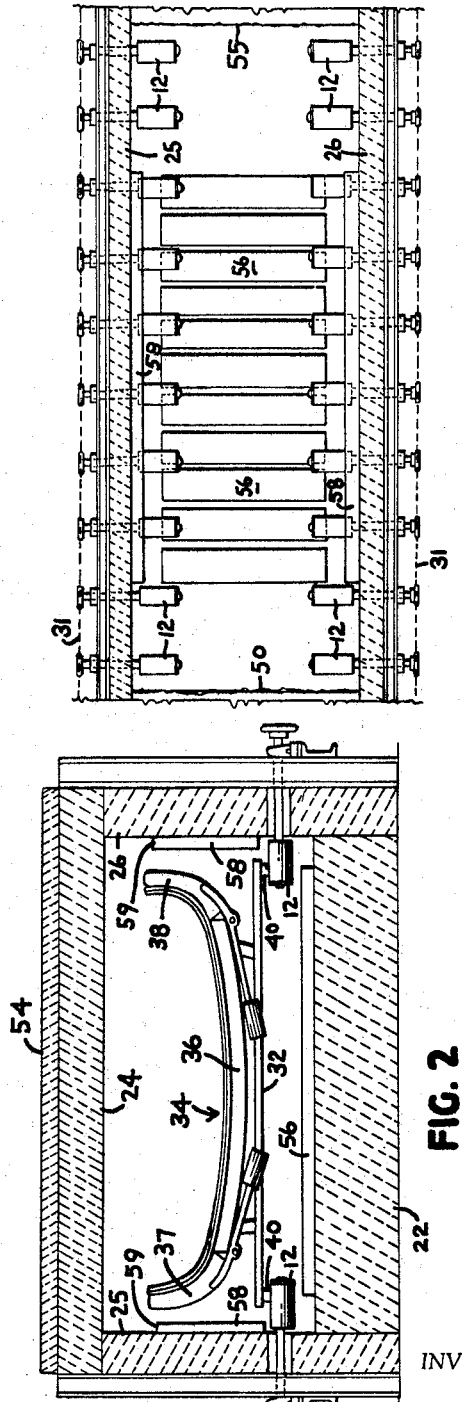
INVENTOR.
ROBERT L. TILTON
BY Chisholm and Spencer
ATTORNEYS INVENTOR.
ROBERT L. TILTON
BY Chisholm and Spencer
ATTORNEYS United States Patent Office 3,387,963
Patented June 11, 1968

3,387,963
ANNEALING LEHR FOR GLASS SHEETS WITH
RERADIATING SIDE WALL PLATES
Robert L. Tilton, Wexford, Marshall Township, Pa., assignor to Pittsburgh Plate Glass Company, Pittsburgh, Pa., a corporation of Pennsylvania
Filed June 25, 1964, Ser. No. 377,839
4 Claims. (Cl. 65—350)

ABSTRACT OF THE DISCLOSURE

Annealing glass sheets supported immediately inside their marginal edges on outline supports by passing supported glass sheets through a controlled temperature zone where the exposed under surface of the glass sheets inward of the supports are directly exposed to auxiliary radiant heat sources to minimize the temperature difference between the bottom surface portion exposed to the auxiliary radiant heat sources and the portion thereof in contact with the support, which latter support reacts more slowly than the glass sheet to an environmental change in temperature. The auxiliary heat also reduces the temperature difference between the exposed portion of the bottom surface and the top surface of the supported glass sheet as the glass sheet cools through the annealing range while so supported.

---

In annealing glass sheets or plates, particularly those which have just undergone bending to produce bent glass sheets such as those used for automobile windshields, it is customary to support glass sheets horizontally upon peripheral or skeleton-type bending molds. The mold and supported sheets are conveyed through a bending furnace with the longitudinal axes of the sheets extending transversely of the furnace and normal to the direction of travel of the molds. During the passage of the molds through the bending furnace, the glass sheets are heated to a temperature at which they become softened and sag into conformity with the shaping surface of the mold.

The heating of the glass sheets is preferably accomplished by providing gas burners and/or electric heaters positioned above the path of travel of the molds. When the windshields are formed of laminated glass, the glass sheets are bent and annealed in pairs.

The present day automobile windshields of the panoramic or wrap-around type comprise a central portion of relatively shallow curvature merging into severely curved portions which form end portions extending rearwardly of the vehicle along its opposite sides. In conforming the glass to the shaping surface of a peripheral mold, it is necessary to accentuate the rate of heating the glass in the regions to be sharply bent and to heat those regions to be bent to shallow curvatures less intensely.

In order to bend the glass sheets into conformity with the upwardly facing edges of the peripheral or outline or skeleton-type bending molds, it is necessary to heat the glass sheets to a temperature above the annealing range. It is also well known that the presence of the outline shaping rail of the bending mold tends to retard the cooling rate of the glass sheet during the period subsequent to bending when the glass is annealed or tempered by cooling through the annealing range.

It has been found to be the best practice in the fabrication of bent automovile glass to cut a pair of glass sheets to pattern first, and then bend them. The bent glass is cooled from the glass bending temperature through its annealing range to a temperature at which undesirable strains are not set up in the glass by subsequent uncontrolled cooling.

In the process described above, wherein the glass sheets are pattern cut prior to bending, it has been customary to use outline or skeleton molds of the shape and size that engage the glass surface as near to the edge of the sheet as possible. This technique insures that any mold scratches or similar defects in the finished bent windshield are concealed by the mounting frame in which the windshield is mounted in the vehicle.

It is also well known that distortion of the bent glass sheet along the lines of contact with the outline mold shaping surface sometimes encountered in bending pattern cut sheets could be avoided by first bending generally rectangular glass sheets and then cutting the bent rectangular sheets to outline. In this latter procedure, it was considered desirable, in order to avoid excessive trim loss, to have rails of the mold for bending the rectangular sheets as near as possible to the line along which the bent sheet was subsequently cut to its final outline.

Edge breakage of windshields produced by the latter procedure became a serious problem until a theory was developed that such edge breakage was due to the presence of a tension strip or band extending along the central portion of the edge of the finished bent sheet which was the direct result of the bending process. It was concluded that the mass of the mold rails retarded the cooling of the area which contained the central side edges of the finished bent sheet. This resulted in a continuous strip or band along the central area of the peripheral side edge of the finished bent sheet that was in tension. It is well known that glass is weak in tension and from this it follows that the tension areas in the strain pattern of a glass sheet are weak areas and most susceptible to breakage.

U.S. Patent No. 2,897,632 to Fowler and Dunipace, issued Aug. 4, 1959, discloses several methods of controlling the stress pattern in a rectangular blank or block size sheet so as to insure that the edge along which the bent sheet is cut to outline develops a compression stress during the bending and annealing while supported on a bending mold of the outline or peripheral type.

The Fowler et al. invention resulted in reduced edge breakage of glass sheets produced by the technique involving cutting after bending rectangular shapes. However, the Fowler et al. technique also involved increasing the amount of glass that had to be trimmed in order to produce the final product. Thus, the gain in production yield of acceptable windshields was offset by the increased costs of waste glass lost by trimming during cutting.

Cutting after bending results in weakened edges that require strengthening by seaming or by reheating. The heating incidental to bending glass sheets previously cut to their ultimate outline strengthens the cut edges by healing vents formed during cutting. Therefore, a process involving cutting a sheet to its ultimate outline before bending is preferred on the basis of producing stronger edges than one involving trimming by cutting the sheets after bending.

It has also been well known that a greater intensity of heat applied to the sharply bent regions of the glass causes more intense heating of the adjacent portions of the outline bending mold. Thus, when glass sheets are bent to nonuniform shapes, the intensely heated regions of the shaping surface retard the rate of cooling of the adjacent sharply bent glass portions more than is the case with other glass sheet portions in contact with the shaping surface. Therefore, tension stress tends to be at a maximum in the regions of sharpest bending.

The present invention has devised apparatus for annealing glass sheets supported in a horizontal orientation on the bottom major surface adjacent its marginal portion only without requiring that a large proportion of the glass be removed and wasted. The present invention has improved the stress distribution throughout the thickness of the bent glass, particularly in its marginal portion, a factor that was never correlated with windshield breakage prior to the present invention.

The above benefit has been accomplished by installing in the portion of an annealing lehr where the glass is cooled through the annealing range devices that tend to impart heat toward the supported surface of the glass sheet within the supported marginal portion. While not necessarily limited thereto, the devices for imparting heat to the supported glass surface may comprise a series of gas burners and/or one or more heat absorbing and reradiating members in position to face the bottom surface only of the supported glass sheet while the glass is conveyed through the region of the glass annealing lehr wherein the glass temperature cools through the annealing range.

An example of a heat absorbing and reradiating member is a plate of heat radiating material such as metal located above the bottom wall of heat insulating material which forms the interior of the lehr. The plate extends both longitudinally and transversely horizontally of the chamber. A series of plates rather than a single plate may be employed. Furthermore, the annealing lehr section may further comprise additional heat absorbing and reradiating members located inward of each lehr side wall of heat insulating material and extending both longitudinally and transversely vertically of the lehr chamber in the region facing the end portions of the glass sheet in those regions where the end sections of the glass are bent upwardly. While it is not necessary to heat the metal plates, a heating means may be provided beneath the horizontally disposed plates to help alter or disturb the normal vertical thermal gradient from the top wall to the bottom wall of the enclosed atmosphere of the annealing lehr.

Prior to the present invention, it was well known that glass exhibits a greater ability to withstand normal stresses of handling and installation when the regions subject to the greatest stresses are stressed in compression rather than tension. In automobile windshields the peripheral edge portion of the glass sheet is particularly susceptible to handling and installation stresses.

It is well known to be desirable to improve the inherent residual stress characteristics of automotive windshield edges by increasing the compressive stress at the edge, thus giving a greater resistance to breaking or chipping along the edge during handling and installation. At the same time, since glass is weak when stressed in tension, it is also desirable to limit the maximum tension stress in the glass. Obviously it would also be advantageous to accomplish a maximum marginal edge compression and a minimum tension stress by using conventional bending and annealing equipment.

Prior to the present invention, the method for measuring stresses involved determining the optical strain associated with both the tensile and compressive stresses established in the glass during bending and annealing. The technique for measuring optical strain involved placing a sheet of bent and annealed glass between a polarized light source and a graduated quartz wedge. The quartz wedge is calibrated in millimicrons. The polarized light passes through the thickness dimension of the sheet to be measured and the quartz wedge.

A trained observer viewing directly into the quartz wedge observes a distinctive band. This band delineates and defines the maximum polarized light deviation caused by a particular type of stress being observed. The graduations of the quartz wedge permit a direct reading of the magnitude of the strain per unit of glass thickness. This is the maximum deviation of a beam of polarized light from the path it would take through the thickness of the glass if the glass were unstressed.

The quality of the sheets in which the stress is measured is selected by scanning the general area to find the locality of the maximum stress. The stress of the selected locality is then measured by looking through the quartz wedge directly into that locality selected.

The compressive stress of the peripheral margin of the sheet is measured by looking at the surface of the sheets directly at their edge, that is, the compressive stress zone. Similarly the tension stress of the peripheral margin of the sheet is measured after selecting the maximum tension stress known in a band from ½ to 1¼ inches inwardly from the edge of the sheet. This is the band wherein the tension stress zone is located.

The graduations of the quartz wedge provide a reading in terms of millimicrons of deviation per unit of glass thickness. The optical strain reading, adjusted to millimicrons per inch, may be converted to pounds per square inch stress units by multiplying the strain reading by the stress optical coefficient. The stress optical coefficient varies for different glass compositions. For commercial plate glass, the conversion factor is 2.13 pounds per square inch stress for each millimicron of strain per inch of glass thickness.

The present invention arose when it was determined that there was poor correlation between the edge compression stresses and the interior tension stresses observed through the quartz wedge on one hand and breakage in the field and from glass sheet handling in the plant on the other.

The gist of the present invention arose from the appreciation of the fact that the breakage encountered in handling during production and in the field was not necessarily correlated with the stress pattern determined by the quartz wedge technique described above, but was a function of the stress gradient from the bottom surface to the top surface of the supporting glass sheet. In particular, when the demand for automobile windshields increased because of a succession of outstanding years for the automobile industry, it became necessary to increase the production rate of bent windshields. Field reports indicated that the increase in production rates was accompanied by reports of increase breakage in the field. Examination of several windshields returned to the laboratory for examination and testing revealed that breakage had occurred as a result of damage to the outside surface of the windshield. Polariscope measurements of stress indicated areas of high tension through the thickness of the glass in the vicinity of the areas of breakage.

A program was started in the production plants to improve annealing conditions. As the work progressed, it became evident that no direct correlation existed between the tension stresses as measured by the quartz wedge technique and the tendency of the glass to break.

Prior to the present invention, no one had considered the fact that the stress in the bottom surface layer differed from the stress in the upper surface layer. Furthermore, it was not appreciated that the tendency to produce a high tension stress in the portion of the surface layer in contact with the peripheral mold shaping surface weakened the surface layer of the ultimate windshield exposed to the elements to a greater extent than the remainder of the glass.

The present invention arose as a direct consequence of an appreciation on the part of applicant as to the nature of the problem which was causing field breakage.

Briefly stated, the present invention first appreciated that windshield breakage in the field could be reduced drastically by controlling the stress pattern in the bottom layer of the glass sheet while supported adjacent its marginal edge for movement through a region of an annealing lehr where the temperature is gradually cooled from above to below annealing range.

The present invention controls the bottom edge stress by introducing heat into the portion of the enclosed atmosphere of the annealing lehr facing the bottom surface of bent glass sheets in the region of the lehr where the glass sheet temperature is cooling through its annealing range. This introduction of heat into the selected portion of the enclosed atmosphere of the annealing lehr reduces the difference in temperature between the temperature of the lehr portion above the path taken by the glass sheets and the temperature of the lehr portion below the path taken by the glass sheets in the lehr region where the glass is cooled through the annealing range. This selective heat introduction also reduces the difference in cooling rate between the supported marginal edge portion adjacent the marginal edge and the remainder of the bottom surface layer as the glass cools through its annealing range. This reduces the tendency of the glass sheet to break.

The present invention will be understood more clearly in the light of the description that follows. In the drawings which form part of the description and where like reference numerals refer to like structural elements, FIG. 1 is a vertical longitudinal section of a typical bending and annealing lehr modified in accordance with one of the embodiments of the present invention;

FIG. 2 is a cross section along the lines II—II of FIG. 1, showing a bent glass sheet and its supporting mold;

FIG. 3 is a longitudinal section of a portion of the annealing section taken along the line III—III of FIG. 1 with the lehr shown empty of glass laden molds.

Figure 4:
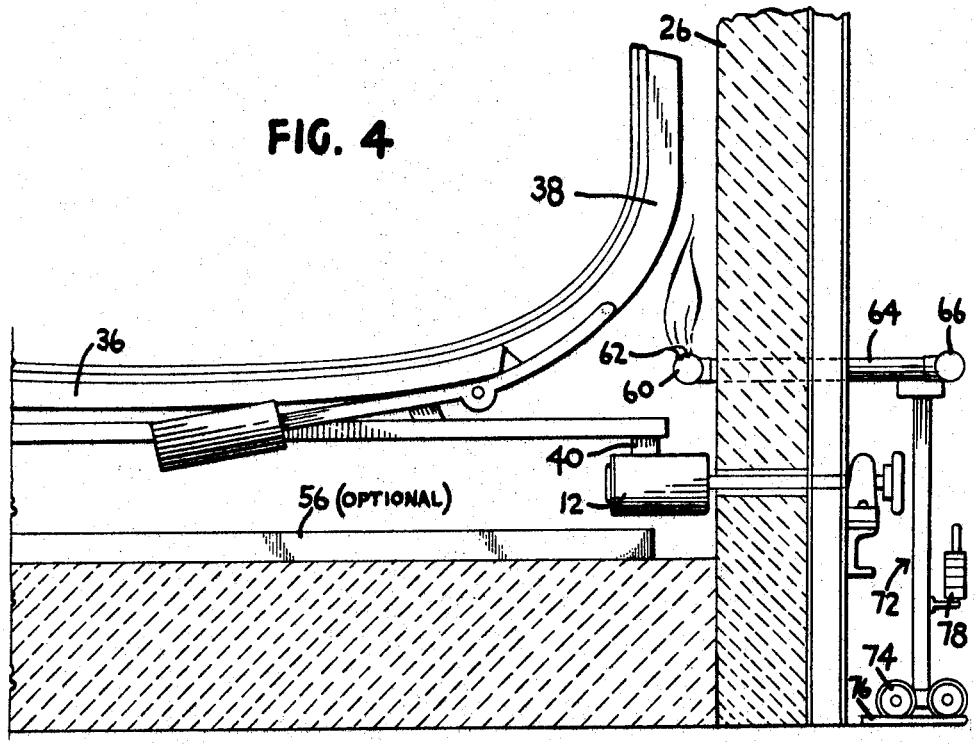
FIGS. 4 and 5 are a partial cross sectional and plan view, respectively, of an alternate embodiment of the present invention.

Referring to the drawings, a conveyor 10 comprising a series of stub rolls 12 extends horizontally from a mold loading station 14 through a tunnel-like bending furnace 16, an annealing lehr 18 and an unloading station 20. The tunnel-like bending furnace 16 and its extension, the annealing lehr 18, are formed by a bottom wall 22, an upper wall 24, and side walls 25 and 26 of refractory, heat-insulating material.

The bending furnace 16 comprises a preheat zone 28 and a bending zone 30. The stub rolls 12 are rotated in unison by a suitable motor and drive shaft means not shown) and sprocket chain drives 31. See FIG. 3. The stub rolls are all rotated in unison to convey a succession of mold support carriages 32, each of which support a sectionalized glass sheet bending mold 34, in a direction transverse to the longitudinal axis of the mold through the preheat zone and the bending zone.

The bending mold 34 comprises a center mold section 36 and end mold sections 37 and 38 pivotally connected in end-to-end relation to the opposite ends of the center section. A typical mold construction is shown in U.S. Patent No. 2,924,045 to Paul Startzell, issued Feb. 9, 1960.

The mold support carriage 32 is provided with a pair of rails 40 whose longitudinal direction extends transversely of the longitudinal dimension of the mold 34. The mold carriage rails 40 ride on the stub rolls 12 so that when the stub rolls are rotated they drive the molds 34 through the bending furnace 16 and the annealing lehr 18 in a direction transversely of their length.

In the preheating zone 28 of the bending furnace, a succession of heating elements 42 is disposed in rows extending transversely of the path of movement taken by the glass supporting molds 34. The heating elements are preferably of the electrical resistance type to effectively control the temperature of the successive portions of the atmosphere of the preheat zone through which flat glass sheets are transported.

A flexible curtain 44 of a refractory material that can withstand the elevated furnace temperatures, such as fiber glass cloth or the like, is suspended between the preheat zone 28 and the bending zone 30.

The bending zone 30 comprises additional heating elements 46 arranged in rows and sets and supported from the upper wall 24 of the furnace. In addition, so-called "crease heaters" 48 of the type disclosed in U.S. Patent No. 2,794,300 to James S. Golightly, issued June 4, 1957, may be suspended to irradiate the portions of the glass sheet to be more sharply bent.

An additional flexible curtain 50 similar to curtain 44 is disposed at the exit of the bending zone 30. The upper wall 24 in the annealing lehr 18 is lower than in the tunnel-like bending furnace 16.

The annealing lehr 18 comprises a first portion adjacent the exit of the furnace that is heavily insulated by a relatively thick layer of insulating material 52 resting on the roof. Farther down the annealing lehr, the layer of insulating material is less thick, as disclosed by reference character 54.

One or more flexible curtains 55 are suspended from the upper wall 24 of the annealing lehr 18 in longitudinally spaced relation. The curtains 55 are similar in construction to curtains 44 and 50 and extend transversely of the lehr at longitudinally spaced positions to compartmentalize the lehr along its length and avoid longitudinal air currents along the lehr length.

A typical production furnace for bending and annealing glass sheets has been described. Modifications suggested by the present invention will be discussed.

According to one embodiment shown in FIGS. 1 through 3, the heat imparting means comprises a series of heat absorbing and reradiating members or plates 56 of heat absorbing and reradiating material, such as metal, supported on the bottom wall 22 of the annealing lehr 18. The plates extend horizontally with their length extending transversely of the annealing lehr and their width longitudinally of the annealing lehr. The horizontal plates 56 supported on the bottom wall 22 of the annealing lehr 18 are in position to face the bottom surface only of the supported glass sheets conveyed through the enclosed atmosphere of the annealing lehr 18.

In addition, vertical plates 58 of a material similar to that of plates 56 are mounted on each side wall 25 and 26 and are located inward of each side wall. The area of the plates 58 extends both longitudinally transversely vertically of the chamber. The upper edges 59 of the additional plates 58 are disposed below the longitudinal extremities of the closed molds 34 as shown in FIG. 2. Vertically oriented plates 58 face the undersurface of the upwardly and inwardly folded longitudinal ends of the glass sheet bottom surface supported on the skeletonized molds 34.

Plates 56 and 58 are preferably of cold rolled steel ¼ inch thick. They selectively absorb radiant energy within the portion of the annealing lehr in which they are installed and selectively impart sufficient heat to the lower portion of the enclosed atmosphere of the annealing lehr facing the supported bottom surface of the supported glass sheets in the region wherein the glass sheet temperature is cooling through its annealing range to reduce the difference in the cooling rate between the portion of the bottom edge surface layer in contact with the peripheral mold and the remainder of the bottom surface layer directly exposed to the atmosphere of the annealing lehr. The presence of the heat absorbing and reradiating members 56 and 58 reduces the temperature differences between the atmosphere of the annealing lehr above the glass sheet and that below the glass sheet compared to the natural temperature difference existing in the absence of the plates.

In another embodiment of the present invention, a series of elongated gas pipes 60 extend longitudinally of the portion of the annealing lehr maintained at a temperature ranging from slightly above to slightly below the annealing range of the glass. The gas pipes have a series of apertures 62 permitting burning gases to escape from the pipes. The apertured pipes thus comprise a series of gas burners within the enclosed chamber of the annealing lehr 18 with the apertures in position to face the bottom surface only of the supported glass sheets conveyed through the temperature region of the annealing section 18 that extends from above the annealing range of the glass to below said annealing range in the direction of glass movement. The burning gases selectively impart heat to the lower portion of the enclosed atmosphere of the annealing lehr facing the supported bottom surface of the glass sheet and also serve to reduce the temperature difference between the portion of the annealing section above the path travelled by the bent glass and that below the path taken by the bent glass compared to what the temperature difference would be in the absence of the burning gas and/or the metal plates 56.

The gas burners 60 are connected at their ends via elbows 63 to transverse pipes 64 extending through apertures in the side walls 25 and 26 of the annealing lehr. The transverse pipes 64 are connected to gas lines 66 through T-couplings 68 or elbows 69. The gas lines 66 are connected to gas mains (not shown) by flexible hose connections 70.

Carriages 72 having wheels 74 mounted on tracks 76 support the gas lines 66 and their attached transverse pipes 64 and elongated gas pipes 60. The transverse pipes 64 may be made of sufficient length to permit the gas lines 66 to be displaced transversely thereof, thus adjusting the position of the gas pipes 60 transversely of the annealing lehr 18. Weights 78 may be provided on the carriages 72 to counterbalance the weight of the gas pipes located inward of the carriage wheels.

Figure 5:
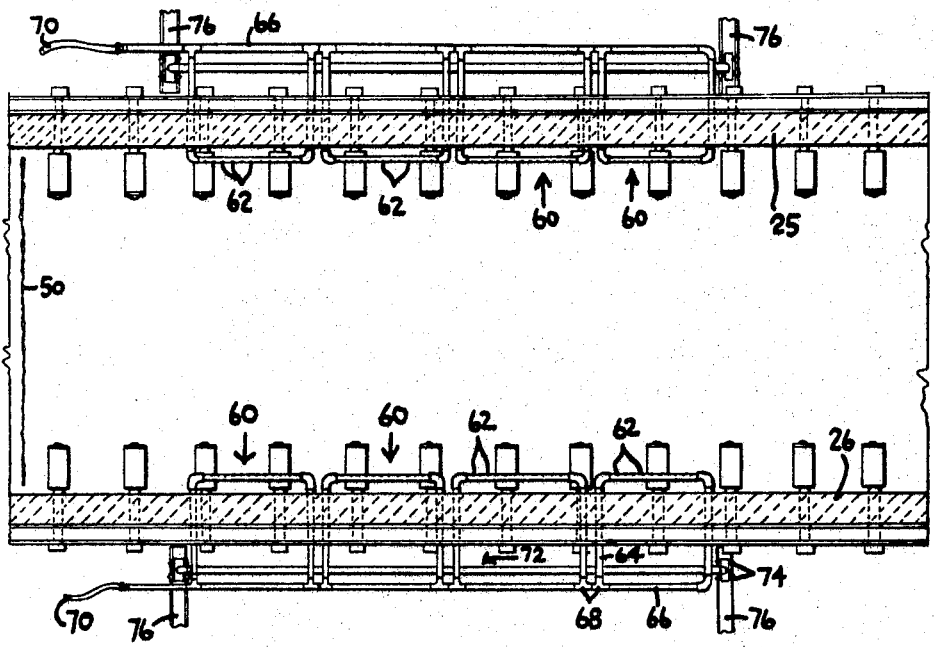

Although it is not absolutely necessary, one or more plates 56 may be used in combination with the gas burners 60 to provide the improved results obtained from the present invention. An optional plate is included in FIG. 4, but omitted from FIG. 5.

In order to determine the effectiveness of the present invention, a test was devised to provide a measure of the ability of a windshield to withstand surface damage. Windshields bent and annealed on outline molds of concave elevation were scribed by a carbide scriber used under moderate pressure to produce a scratch 2 inches to 3 inches long starting approximately 1/8 inch inward from the glass edge and running perpendicular to it. Such scratches were made at 2 inch intervals around the entire periphery of the windshield.

The scratched windshields were stored for 24 hours. The number of such scratches that produced vents within 24 hours was noted.

Considerable experimentation has determined that over 95 percent of the vents occur from scratches on the convex surface. After making such determination, the scratch test described above was used only on the convex surface. The latter surface had its marginal edge portion in contact with the outline mold during bending and annealing.

In one test a lehr using metal plates 56 and 58 was run for a 4 week period, during which time 13 different windshield patterns were run. The average number of vents appearing within 24 hours of the scribing did not exceed 4.5 for any of the 13 patterns. During the month preceding the 4 week test, during which time the lehr did not have the metal sheets, the number of vents produced by the scratch test ran from an average of 6.0 to 20.5 per plate. This lehr was of the FIGS. 1–3 type.

In another experiment, using 4 different windshield patterns comparing the results of the scratch test on windshield patterns produced in a lehr with the burners off compared to those produced in the same lehr with burners on, the average number of vents in the scratch test was reduced from 4.7 to 4.1 for one pattern, from 13.7 to 5.0 for a second pattern, from 4.1 to 3.2 for a third pattern, and from 14.8 to 6.6 for a fourth pattern.

The scratch test program described above involved the destructive testing of more than 2500 windshields.

Field reports of windshield breakage in the field indicated a marked lessening after production lehrs were changed in accordance with the teachings of the present invention. In fact, the reduction in frequency of windshield breakage in the field has been so dramatic in recent weeks that it is believed that virtually all breakage presently met in the field results from windshields fabricated before the lehrs were changed.

A description of certain illustrative embodiments of the present invention has been made for the purpose of illustration. Many equivalent methods of operation will become obvious in the light of the present disclosure. Reference to the scope of the present invention may be obtained from the claimed subject matter which follows.

What is claimed is:

1. An annealing lehr section for annealing glass sheets comprising a horizontally elongated tunnel-like chamber of heat insulating material comprising a bottom wall, side walls, and a top wall, conveyor means for conveying a glass support apparatus of the outline-type for continuously supporting a glass sheet thereon throughout the movement of said outline-type support apparatus along a substantially horizontal path through said chamber, and heat imparting means disposed in spaced relation below the path taken by said support apparatus within a portion of said chamber wherein the conveyed glass is at temperatures within its annealing range in facing relation to the bottom surface only of a said supported glass sheet conveyed through said chamber and wherein said heat imparting means comprises a heat absorbing and reradiating member located above said bottom wall of heat insulating material and extending both longitudinally and transversely below said path in position to face the bottom surface only of said supported glass sheet conveyed through said chamber along said path.

2. An annealing lehr section as in claim 1 for annealing bent glass sheets further comprising a heat absorbing and reradiating member located inward of each side wall of said heat insulating material and extending both longitudinally horizontally and transversely vertically of said path in position to face the bottom surface only of said supported glass sheet conveyed through said chamber along said path.

3. An annealing lehr section for annealing bent glass sheets comprising a horizontally elongated tunnel-like chamber of refractory, heat insulating material comprising a bottom wall, side walls and a top wall, conveyor means for conveying a glass support apparatus having a curved outline support surface for continuously supporting a bent glass sheet thereon throughout the movement of said support apparatus along a substantially horizontal path through said chamber, said annealing lehr section having a gradually diminishing temperature along its length ranging from above to below the annealing range of glass, said outline support surface retarding the cooling rate of a portion of said bent glass sheet in contact therewith through said annealing lehr section, metal plates attached to said bottom wall and said side walls in position to face the bottom surface only of said bent glass sheet when the latter is conveyed through said annealing lehr section while supported on said curved outline support surface and to selectively absorb and reradiate energy to the lower portion of said annealing lehr section facing the bottom surface of said supported glass sheet.

4. In combination with the annealing lehr section of claim 3, radiant heat sources in said annealing lehr section arranged to radiate heat toward at least some of said metal plates.

References Cited

UNITED STATES PATENTS

| 2,561,529 | 7/1951 | Mongan | 65—349 X |
| 2,967,378 | 1/1961 | Jones et al. | 65—104 X |
| 3,253,898 | 5/1966 | Leflet et al. | 65—104 X |

FOREIGN PATENTS 1,299,062  6/1962  France.

DONALL H. SYLVESTER, *Primary Examiner.*

A. D. KELLOGG, *Assistant Examiner.*